US012732498B2

(12) United States Patent
Dubrovsky et al.

(10) Patent No.: US 12,732,498 B2
(45) Date of Patent: Sep. 8, 2026

(54) VALIDATING EDGE COMPUTING DEVICES USING VERIFICATION OF NETWORK IDENTIFIERS

(71) Applicant: Dell Products L.P., Round Rock, TX (US)

(72) Inventors: Igor Dubrovsky, Beer Sheva (IL); Maxim Balin, Gan-Yavne (IL); Mukesh Gupta, Shrewsbury, MA (US)

(73) Assignee: Dell Products L.P., Round Rock, TX (US)

( * ) Notice: Subject to any disclaimer, the term of this patent is extended or adjusted under 35 U.S.C. 154(b) by 71 days.

(21) Appl. No.: 18/816,598

(22) Filed: Aug. 27, 2024

(65) Prior Publication Data

US 2026/0067276 A1 Mar. 5, 2026

(51) Int. Cl.
*H04L 9/40* (2022.01)
*H04W 12/30* (2021.01)

(52) U.S. Cl.
CPC .................. *H04L 63/0876* (2013.01)

(58) Field of Classification Search
CPC .................. H04L 63/0876
USPC .................. 726/7
See application file for complete search history.

(56) References Cited

U.S. PATENT DOCUMENTS 12,184,772 B1 * 12/2024 Belchee .................. G06Q 50/18
12,376,059 B2 * 7/2025 Gupta .................. H04W 4/70
2020/0045519 A1 * 2/2020 Raleigh .................. H04W 4/08
2022/0322083 A1 * 10/2022 Kreishan .................. H04W 12/0431
2024/0147240 A1 * 5/2024 Boyapalle .................. H04W 12/06
2024/0323034 A1 * 9/2024 Kumar .................. H04L 9/3268
2025/0023714 A1 * 1/2025 Kumar .................. G06N 20/00

OTHER PUBLICATIONS

Christos Tsigkanos; Edge-Based Runtime Verification for the Internet of Things; IEEE:2021; pp. 2713-2727.*
"Device Onboarding Overview"; Fido Alliance; downloaded on Aug. 22, 2024.
"Fido Device Onboard Specification"; Fido Alliance; Dec. 2, 2020.

(Continued)

*Primary Examiner* — Monjur Rahim
(74) *Attorney, Agent, or Firm* — Ryan, Mason & Lewis, LLP

(57) ABSTRACT

Techniques are provided for validating edge computing devices using verification of network identifiers. One method comprises obtaining an ownership voucher for an edge device, wherein the ownership voucher comprises credentials of the edge device, wherein the edge device comprises an integrated circuit used by the edge device to access a network, such as a mobile network, and wherein the ownership voucher further comprises: (i) an identifier of the integrated circuit used to access the network and/or (ii) an identifier of the network; verifying, by a provider of the network: (i) the identifier of the integrated circuit and/or (ii) the identifier of the network; and automatically enabling the edge device to access the network based on a result of the verifying. The ownership voucher may comprise an identifier of a subscriber of the network and the provider of the network may verify the identifier of the subscriber of the network.

20 Claims, 7 Drawing Sheets

(56) References Cited

OTHER PUBLICATIONS

Cooper, Jeffrey; "Device Onboarding Using FDO and the Untrusted Installer Model"; Internet of Things ACMqueue; Sep.-Oct. 2023.

U.S. Appl. No. 18/492,865 entitled, "Management of Edge Computing Network Deployments with Legacy Edge Devices"; filed Oct. 24, 2023.

* cited by examiner

702-K
PROCESSING DEVICE
PROCESSING DEVICE
702-3
PROCESSING DEVICE
702-2
NETWORK
704
700
PROCESSING DEVICE
NETWORK INTERFACE
PROCESSOR
MEMORY
714
710
712
702-1

VALIDATING EDGE COMPUTING DEVICES USING VERIFICATION OF NETWORK IDENTIFIERS

BACKGROUND

An edge infrastructure management platform centralizes deployment and management of edge infrastructure and applications across geographically distributed locations. The rapid expansion of edge computing, particularly in environments where local area network connections are not present, underscores the need for robust security protocols.

SUMMARY

Illustrative embodiments of the disclosure provide techniques for validating edge computing devices using verification of network identifiers. One method includes obtaining at least a portion of at least one cryptographically attested digital document for at least one edge device, wherein the at least one cryptographically attested digital document comprises one or more credentials of the at least one edge device, wherein the at least one edge device comprises at least one integrated circuit used by the at least one edge device to access at least one network, and wherein the at least one cryptographically attested digital document further comprises one or more of: (i) at least one identifier of the at least one integrated circuit used to access the at least one network and (ii) at least one identifier of the at least one network; verifying, by at least one processing device of a provider of the at least one network, one or more of: (i) the at least one identifier of the at least one integrated circuit and (ii) the at least one identifier of the at least one network; and automatically enabling the at least one edge device to access the at least one network based at least in part on a result of the verifying.

Illustrative embodiments can provide significant advantages relative to conventional techniques. For example, technical problems related to such conventional techniques are mitigated in one or more embodiments by a network provider verifying an identifier of an integrated circuit used by an edge device to access a network and/or an identifier of the network.

These and other illustrative embodiments described herein include, without limitation, methods, apparatus, systems, and computer program products comprising processor-readable storage media.

DETAILED DESCRIPTION

Figure 1:
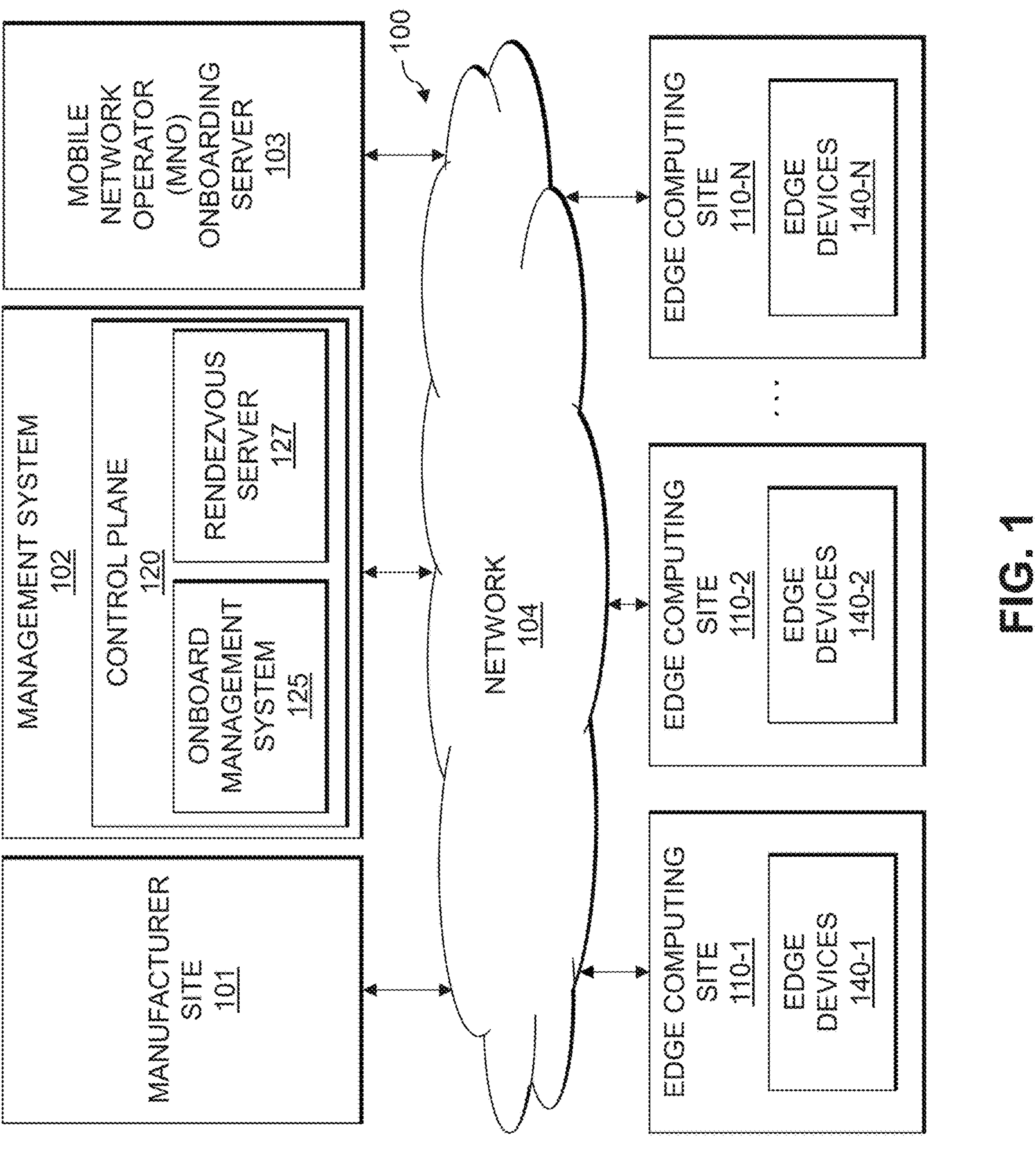
FIG. 1 is a block diagram of an information processing system configured for validating edge computing devices using verification of network identifiers in an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for validating edge computing devices using verification of network identifiers.

An edge infrastructure management platform centralizes deployment and management of edge infrastructure and applications across geographically distributed locations. In illustrative embodiments, an edge infrastructure management platform securely scales edge operations using automation, open design, zero-trust security principles and/or multi-cloud connectivity.

As edge devices increasingly employ mobile networks, such as 4G (e.g., fourth generation) and 5G (e.g., fifth generation) mobile networks, network connectivity is performed using machine-to-machine communications, for example, using Subscriber Identity Module (SIM) cards (also referred to as Universal Integrated Circuit Cards or UICCs) or other integrated circuits embedded in the edge devices. The SIM cards and UICCs are typically identified by an embedded SIM electronic identifier (EID) that is a unique identifier associated with the embedded SIM card in a device (used, for example, to verify the authenticity of the SIM card). The SIM cards store the credentials and security keys that uniquely identify a particular cellular subscription account. The SIM cards use an International Mobile Subscriber Identity (IMSI) number that is substantially unique for every connected device (whether the device is currently on or off the network), anywhere in the world. Alternatively, the SIM cards can use a Mobile Subscriber Integrated Services Digital Network (MSISDN) for the same purpose.

In addition, a mobile network operator (MNO) that provides a mobile network may be identified by an MNO identifier that ensures secure and legitimate associations within an edge computing environment. An international mobile subscriber identity (IMSI) is a unique identifier associated with a mobile subscriber and may be used for identification in the mobile network and may form part of the disclosed ownership voucher system to establish the legitimacy of the mobile provider.

In one or more embodiments, the disclosed techniques for validating edge computing devices using verification of network identifiers combines advanced modem technology with SIM capabilities to provide a foundation for secure and reliable connections. Furthermore, the integration of an ownership voucher system within the Fast ID Online (FIDO) framework incorporates SIM identifiers, MNO identifiers and/or customer IMSI ranges, serving as a comprehensive mechanism to verify the legitimacy of the SIM card and establish trust in the associated mobile provider.

In at least some embodiments, edge devices are secured during an onboarding process, independent of wide area network access, to employ SIM cards to enhance overall security for secure onboarding of edge devices. By integrating modern FIDO Device Onboarding (FDO) and SIM capabilities with an improved ownership voucher, trust and security are provided in the field of edge computing.

One or more aspects of the disclosure recognize that current edge computing environments exhibit a significant security challenge, particularly in the onboarding process of edge devices. Existing methodologies lack a comprehensive solution for ensuring the legitimacy of SIM cards and establishing trust in the mobile providers during the onboarding phase. The absence of robust controls allows an adversary to potentially manipulate a SIM card in an edge device, compromising the security of the connection channel. The disclosed techniques for validating edge computing devices using verification of network identifiers, in at least some embodiments, address this problem by integrating advanced modem technology, SIM capabilities and FDO principles, along with an ownership voucher system. In this manner, the security and trustworthiness of the onboarding process in edge computing environments is enhanced. Ownership vouchers for edge devices are extended during the onboarding process to include SIM identifiers (or another network card identifier), MNO identifiers and/or customer IMSI ranges specific to each customer and these values may be validated by a mobile network operator prior to enabling a given edge device to access a network provided by the mobile network operator.

FIG. 1 shows a computer network (also referred to herein as an information processing system) 100 configured in accordance with an illustrative embodiment. The information processing system 100 is assumed to be built on at least one processing platform and provides functionality for managing edge computing network deployments. As shown in FIG. 1, one or more edge computing sites 110-1, 110-2, . . . 110-N (collectively, edge computing sites 110) are connected to a management system 102 using a network 104, where the network 104 in this embodiment is assumed to represent a sub-network or other related portion of the larger computer network 100. Accordingly, elements 100 and 104 are both referred to herein as examples of “networks,” but the latter is assumed to be a component of the former in the context of the FIG. 1 embodiment. Also coupled to network 104 is a manufacturer site 101 and a mobile network operator (MNO) onboarding server 103. In some embodiments, the management system 102 is remote from the edge computing sites 110. In other embodiments, the management system 102 or one or more components thereof are part of one or more of the edge computing sites 110.

In illustrative embodiments, each of the edge computing sites 110 comprises edge devices 140-1, 140-2, . . . 140-N (collectively, edge devices 140), which may be, for example, computing devices. As used herein, a “computing site” refers to a compute endpoint (e.g., edge compute endpoint (ECE)) comprising, but not necessarily limited to, servers, gateways and/or computers located at a location where computing occurs.

The edge computing sites 110 may represent different customer sites or other data centers or computing sites that may be remote from the management system 102. As noted herein above, in some embodiments, however, one or more of the edge computing sites 110 may be co-located with the management system 102 (e.g., at a same data center, a same cloud infrastructure, etc.). The management system 102 comprises a control plane 120 including, but not necessarily limited to, an onboard management system 125 and a rendezvous server 127. The management system 102 is assumed to further comprise a plurality of devices or nodes (e.g., physical and virtual computing resources or other information technology (IT) assets not shown in FIG. 1) that implement the control plane 120 including the onboard management system 125 (e.g., an onboarding service) providing zero touch provisioning logic, enabling provisioning and configuration of sets of edge devices 140 deployed at the edge computing sites 110. As described in more detail elsewhere herein, one or more edge devices 140 may implement instances of zero touch provisioning logic to onboard the edge devices 140 to an edge infrastructure management platform managed by the management system 102. The onboarding is performed through secure communication with the control plane 120 of the management system 102. The instances of zero touch provisioning logic may be, for example, software and/or firmware-based.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The manufacturer site 101, the management system 102, the MNO onboarding server 103 and/or the edge devices 140 in this embodiment can comprise a processor coupled to a memory and a network interface. The processor illustratively comprises a microprocessor, a microcontroller, an application-specific integrated circuit (ASIC), a field-programmable gate array (FPGA) or other type of processing circuitry, as well as portions or combinations of such circuitry elements. The memory illustratively comprises random access memory (RAM), read-only memory (ROM) or other types of memory, in any combination. The memory and other memories disclosed herein may be viewed as examples of what are more generally referred to as “processor-readable storage media” storing executable computer program code or other types of software programs. The network interface allows the manufacturer site 101, the management system 102, the MNO onboarding server 103 and/or the edge devices 140 to communicate over the network 104, and illustratively comprises one or more conventional transceivers.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term “article of manufacture” as used herein should be understood to exclude transitory, propagating signals. These and other references to “disks” herein are intended to refer generally to storage devices, including solid-state drives (SSDs), and should therefore not be viewed as limited in any way to spinning magnetic media.

As used herein, “zero touch” provisioning refers to configuration or other provisioning of a computing device that does not require manual intervention. Thus, zero touch provisioning enables the computing device to be configured or otherwise provisioned without needing a human operator to physically type or otherwise provide input into a system console of the computing device being provisioned. As described in further detail below, zero touch provisioning in some cases only requires that a computing device be placed in some desired location and connected to power and be configured to connect to a network (e.g., either via a physical network cable or via a wireless network interface). Zero touch provisioning advantageously enables provisioning of a computing device remotely (e.g., from a control plane 120 of the management system 102) and automatically.

The edge devices 140 may comprise, for example, physical computing devices such as Internet of Things (IoT) devices, mobile telephones, laptop computers, tablet computers, desktop computers or other types of devices. The edge devices 140 are examples of what are more generally referred to herein as "processing devices." Some of these processing devices are also generally referred to herein as "computers." The edge devices 140 may also or alternately comprise virtualized computing resources, such as virtual machines (VMs), containers, etc.

The edge devices 140 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

The manufacturer site 101 is connected to the management system 102 via network 104 in the example of FIG. 1. As explained in more detail herein, at the time of manufacture, device-specific credentials are created within the edge devices 140, and are shared with the device manufacturer in the form of private keys. The illustrative embodiments are described in connection with the onboarding of the edge devices 140 to the edge infrastructure management platform (e.g., management system 102).

Although not explicitly shown in FIG. 1, one or more input-output devices such as keyboards, displays or other types of input-output devices may be used to support one or more user interfaces to the management system 102 and edge computing sites 110, as well as to support communication between the management system 102, the edge computing sites 110, and other related systems and devices not explicitly shown.

It is to be understood that the particular set of elements shown in FIG. 1, such as the management system 102, the control plane 120, the onboard management system 125, the rendezvous server 127, the edge devices 140 and/or other elements in FIG. 1, is presented by way of illustrative example only, and in other embodiments additional or alternative elements may be used. Thus, another embodiment includes additional or alternative systems, devices and other network entities, as well as different arrangements of modules and other components.

For example, although there are elements in the FIG. 1 embodiment that are depicted as being part of the management system 102 and edge computing sites 110, such elements or at least a portion thereof may in other embodiments be implemented at least in part externally to the management system 102 and/or edge computing sites 110, for example, as a stand-alone server, set of servers or other type of system coupled via one or more networks to the management system 102 and/or edge computing sites 110.

The management system 102, control plane 120, onboard management system 125, rendezvous server 127, edge devices 140 and other elements in the FIG. 1 embodiment are assumed to be implemented using at least one processing device. Each such processing device generally comprises at least one processor and an associated memory, and implements at least a portion of the disclosed functionality for validating edge computing devices using verification of network identifiers.

It is to be appreciated that the particular arrangement of management system 102, control plane 120, onboard management system 125, rendezvous server 127, edge devices 140 and other elements in the FIG. 1 embodiment is presented by way of example only, and alternative arrangements can be used in other embodiments.

The management system 102, control plane 120, onboard management system 125, rendezvous server 127, edge devices 140 and other elements in the FIG. 1 embodiment, as described above and in further detail below, may be part of a cloud infrastructure.

The management system 102, control plane 120, onboard management system 125, rendezvous server 127, edge devices 140 and other elements in the FIG. 1 embodiment are assumed to be implemented using at least one processing platform comprising one or more processing devices each having a processor coupled to a memory. Such processing devices can illustratively include particular arrangements of compute, storage and network resources.

The management system 102, control plane 120, onboard management system 125, rendezvous server 127, edge devices 140 and other elements in the FIG. 1 embodiment, may be implemented on respective distinct processing platforms, although numerous other arrangements are possible.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the management system 102, control plane 120, onboard management system 125, rendezvous server 127, edge devices 140 and other elements, or portions or components thereof, to reside in different data centers. Numerous other distributed implementations are possible.

Additional examples of processing platforms utilized to implement management system 102, control plane 120, onboard management system 125, rendezvous server 127, edge devices 140 and other elements of the system 100 in illustrative embodiments will be described in more detail below in conjunction with FIGS. 6 and 7. It is to be appreciated that these and other features of illustrative embodiments are presented by way of example only, and should not be construed as limiting in any way.

Figure 2:
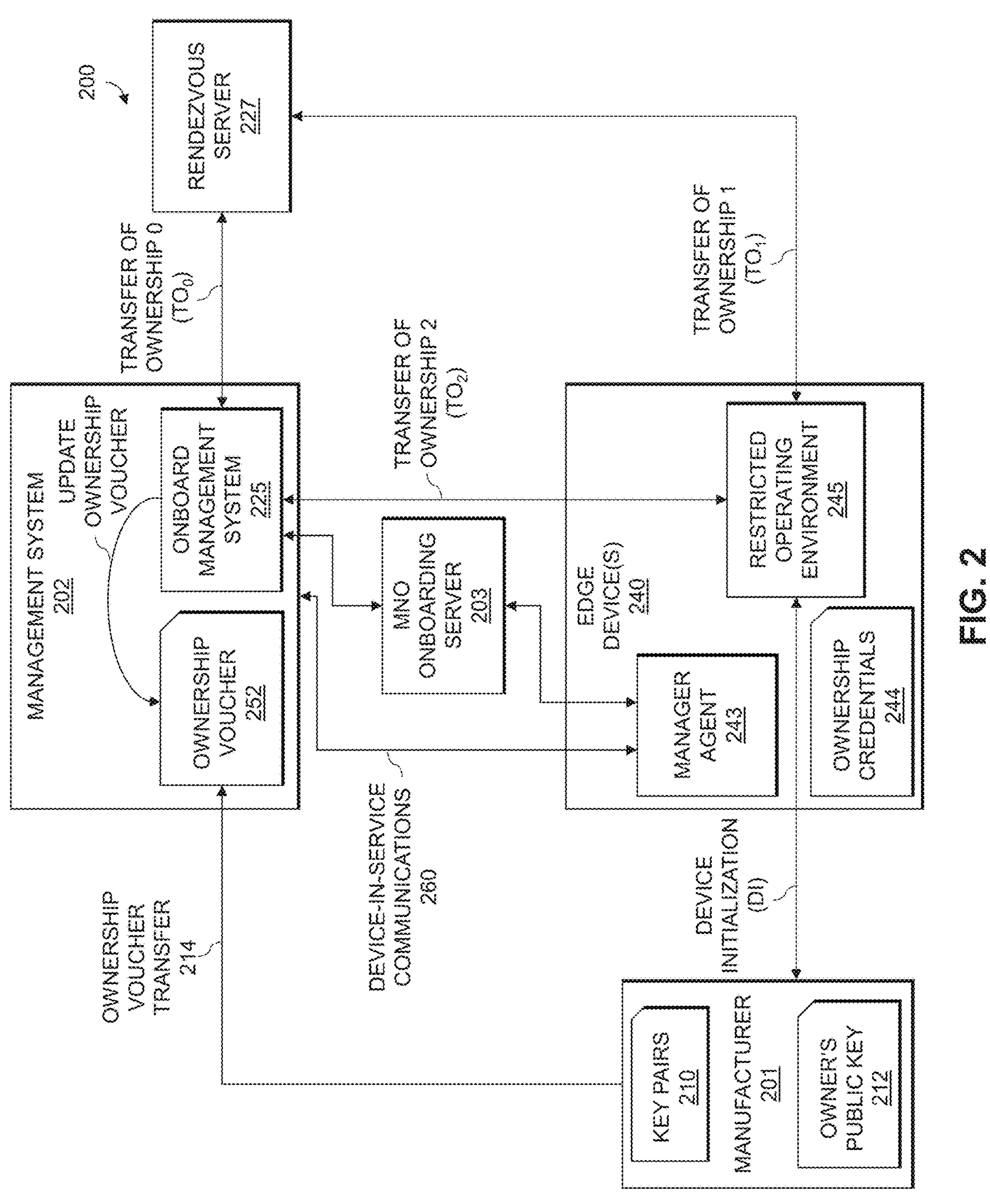
FIG. 2 shows a system flow for a secure device onboarding protocol that may be enabled utilizing zero touch provisioning in an illustrative embodiment.

FIG. 2 shows a system flow 200 for a secure device onboarding (SDO) protocol that may be enabled utilizing zero touch provisioning in an illustrative embodiment. In illustrative embodiments, asymmetric public keys corresponding to the private keys (e.g., public keys of public-private key pairs) identifying edge devices 240 that may be new additions to the edge computing site 110 and ownership credentials 244 are placed into a cryptographically attested digital document called an ownership voucher 252 which identifies an edge device 240. The ownership voucher 252 is sent to the management system 202, which is the same as or similar to the management system 102. The management system 202 corresponds to an owner entity and its related systems and services through which a given edge device 240 is intended to operate. For example, device identity information captured at the time of manufacturing is made available to the owner entity (via management system 202), and any corresponding control planes and systems (e.g., control plane 120 of FIG. 1 and onboard management system 225). The onboard management system 225 and the rendezvous server 227 in FIG. 2 may be the same as or similar to the onboard management system 125 and the rendezvous server 127 in FIG. 1. In addition, the manufacturer 201 may be the same as or similar to the manufacturer site 101 in FIG. 1.

In some embodiments, the management system 202 and edge computing sites 110 collectively provide at least a portion of an information technology (IT) infrastructure operated by an enterprise. The IT infrastructure comprising the management system 202 and edge computing sites 110 may therefore be referred to as an enterprise system. As used herein, the term "enterprise system" is intended to be construed broadly to include any group of systems or other computing devices. In some embodiments, an enterprise system includes cloud infrastructure comprising one or more clouds (e.g., one or more public clouds, one or more private clouds, one or more hybrid clouds, combinations thereof, etc.). The cloud infrastructure may host at least a portion of the management system 202 and/or edge computing sites 110. A given enterprise system may host assets that are associated with multiple enterprises (e.g., two or more different businesses, organizations or other entities). For example, in some cases different ones of the edge computing sites 110 are associated with different enterprises (e.g., different customers or end-users) which purchase devices from another enterprise that is an operator of the management system 202 (e.g., a manufacturer or vendor of the edge devices 240 deployed at the edge computing sites 110).

When edge devices 240 of an edge computing site 110 are connected to a network, a zero touch onboarding process can be performed to connect the edge devices 240 to the management system 202 via a secure device onboard connection. In illustrative embodiments, FDO is leveraged to enable zero touch onboarding, which is performed via firmware-based and/or runtime agents. The zero touch onboarding process provides a bootstrapping strategy enabling computing devices (e.g., edge devices 140 that may be new additions to the edge computing site 110) to securely obtain bootstrapping data with no installer action beyond physical placement and connecting network and power cables. As such, the zero touch onboarding processes enable non-technical personnel to bring up computing devices in remote locations without the need for any operator input. The zero touch onboarding processes provide functionality for updating a boot image, committing an initial configuration, and executing arbitrary scripts to address auxiliary needs on computing devices. The updated computing devices are subsequently able to establish secure connections with other systems. Zero touch onboarding processes provide a mechanism for defining a "good security posture" of a computing device as described herein. For example, a bare-metal computing device holds a firmware-based secure boot ROM (e.g., a Universal Extensible Firmware Interface (UEFI) secure boot ROM), and the system as a whole is capable of Trusted Platform Module (TPM)-based Integrity Measurement Architecture (IMA) for measuring boot security, where each boot stage is reported into the Platform Configuration Register (PCR) registers of the TPM. IMA security may be defined using various Trusted Computing Group (TCG) Extensible Firmware Interface (EFI) Platform and Protocol specifications. With IMA security, it is possible to assure a high level of confidence regarding: (1) platform consistency and integrity (e.g., a failure of IMA will fail the boot process and initiate a recovery); and (2) device trustworthiness that can be communicated to the control plane.

In the example of FIG. 2, an FDO or other SDO protocol involves the manufacturer 201, one or more edge devices 240, the management system 202 operated by a manager (or owner) and the rendezvous server 227. The manufacturer 201 manufactures the edge devices 240. The manufacturer 201 has an associated key pair 210 and the public key 212 of the owner. The edge devices 240 implement a manager agent 243 and a trusted execution environment (TEE) application (e.g., an FDO/SDO client), and have ownership credentials 244. The management system 202 implements the onboard management system 225 and has an ownership voucher 252 for each of the edge devices 240 provided to the management system 202 from the manufacturer 201 using an ownership voucher transfer 214. The onboard management system 225 may perform one or more updates of the ownership voucher 252, as shown in FIG. 2. The edge devices 240 may be shipped from the manufacturer 201 (e.g., to one or more customer locations) independent of the ownership voucher 252, and ownership may be transferred multiple times until the edge devices 240 are powered on. The rendezvous server 227 enables multiple instances of the management system 202 to each register a range of devices which that management system 202 owns. Device initialization (DI) includes the key pair 210 of the manufacturer 201 being used to create an initial credential and ownership voucher. The certificate of the manufacturer 201 (e.g., the public key 212 of the owner) is published to the rendezvous server 227. A device string is configured by the manufacturer 201 and the uniform resource locator (URL) of the rendezvous server 227. As used herein, a "certificate" refers to a data file that includes information for verifying the identity of a device (e.g., server, edge device (client)). The information includes, for example, the public key, an identification of the issuing authority of the certificate (e.g., certificate authority), and an expiration date of the certificate. A handshake refers to a process for verifying a certificate and a possession of the private key by a device. The handshake can also establish how encryption will take place once the handshake is finished.

The manufacturer 201 is connected to the management system 202. At the time of manufacture, device credentials specific to the edge devices 240 are created within the edge devices 240, and are shared with the manufacturer 201 in the form of, for example, private keys. In illustrative embodiments, the asymmetric public keys corresponding to the private keys identifying the edge devices 240 (e.g., public keys of public-private key pairs) and ownership credentials 244 are placed into a cryptographically attested digital document called an ownership voucher 252, which identifies a given edge device 240. The ownership voucher 252 is sent to management system 202 so that when a given edge device 240 is ready to be onboarded, the edge device 240 can be verified. In other words, any device identity information captured at the time of manufacturing (e.g., in the form of public keys of public-private key pairs) is made available to the management system 202 and its associated control planes and systems in which the corresponding edge devices 240 will operate.

In illustrative embodiments, device credentials include a private key that is provisioned into a given edge device 240 (e.g., when a CPU or motherboard is manufactured) for establishing trust for the restricted operating environment 245 that runs on the device. A digital signature by the private key provides evidence of code being executed in the restricted operating environment 245. The ownership credentials 244 comprise, for example, a key pair 210 that serves to identify a current owner of a given edge device 240. When an edge device 240 is manufactured, the manufacturer 201 uses the key pair 210 as an initial ownership credential 244, which is replaceable with new ownership credentials 244 when ownership is transferred.

Transfer of ownership (TO) will now be described in more detail. TO may involve multiple steps or phases, denoted $TO_0$, $TO_1$ and $TO_2$. In $TO_0$, the onboard management system 225 has the device ID, ownership voucher 252, private key and IP address of the management system 202. The onboard management system 225 registers with the rendezvous server 227 using the device ID and ownership voucher 252. The rendezvous server 227 verifies the public key of the manufacturer 201 from the ownership voucher 252, and sets a timer to wait for $TO_1$. If an edge device 240 does not contact the rendezvous server 227 within a set time interval, the rendezvous server 227 clears registration and the onboard management system 225 must repeat $TO_0$. $TO_1$ includes the edge device 240 contacting the rendezvous server 227 with the device ID, and the rendezvous server 227 returning the URL of the management system. $TO_2$ includes the edge device 240 reaching out to the onboard management system 225. The management system 202 proves possession of the private key to the edge device 240 and sends the ownership voucher 252 to the edge device 240. The edge device 240 verifies the chain of trust in the ownership voucher 252, and the management system 202 resets the credentials. The management system 202 and edge device 240 may then perform any required post-SDO communication, such as device-in-service communications 260.

The rendezvous server 227 may provide various discovery options, including those specified in: Internet Engineering Task Force (IETF) Request for Comments (RFC) 8572 Secure Zero Touch Provisioning (SZTP)-DHCP option via 143 SZTP server address; IETF RFC 8552 Scoped Interpretation of DNS Resource Records through "Underscored" Naming of Attribute Leaves—DNS resource record locator; etc. In some embodiments, the rendezvous server 227 may have URLs "rendezvous.customer.com" and "rendezvous-.provider.com" where "provider" may be the name of the manufacturer 201, the manager/owner of the management system 202, etc. For air-gapped devices, Yubico® or a 4G-enabled gateway may be utilized. Yubico Yubikey®, for example, may utilize OpenPGP, Open Authentication Time-Based One-Time Password (OATH-TOTP), a Personal Identity Verification (PIV) smartcard interface, FIDO Universal 2nd Factor Authentication (U2F) or FIDO2, and configuration sets for enabling authentication in air-gapped device scenarios.

In addition, the management system 202 also onboards the mobile network operator by interacting with the MNO onboarding server 203, which may be the same as or similar to the MNO onboarding server 103 of FIG. 1. For example, the MNO onboarding server 203 provides an MNO identifier of the mobile network operator. The MNO onboarding server 203 employs the disclosed techniques for validating edge computing devices using verification of network identifiers. For example, the MNO onboarding server 203 may validate one or more MNO identifiers, one or more SIM identifiers and one or more IMSI identifiers in the ownership voucher, as discussed further below in conjunction with FIG. 3, for example.

Among other benefits, the onboarding process of FIG. 2 protects the onboarded edge device 240 and the communication channel used by such edge device 240.

Figure 3:
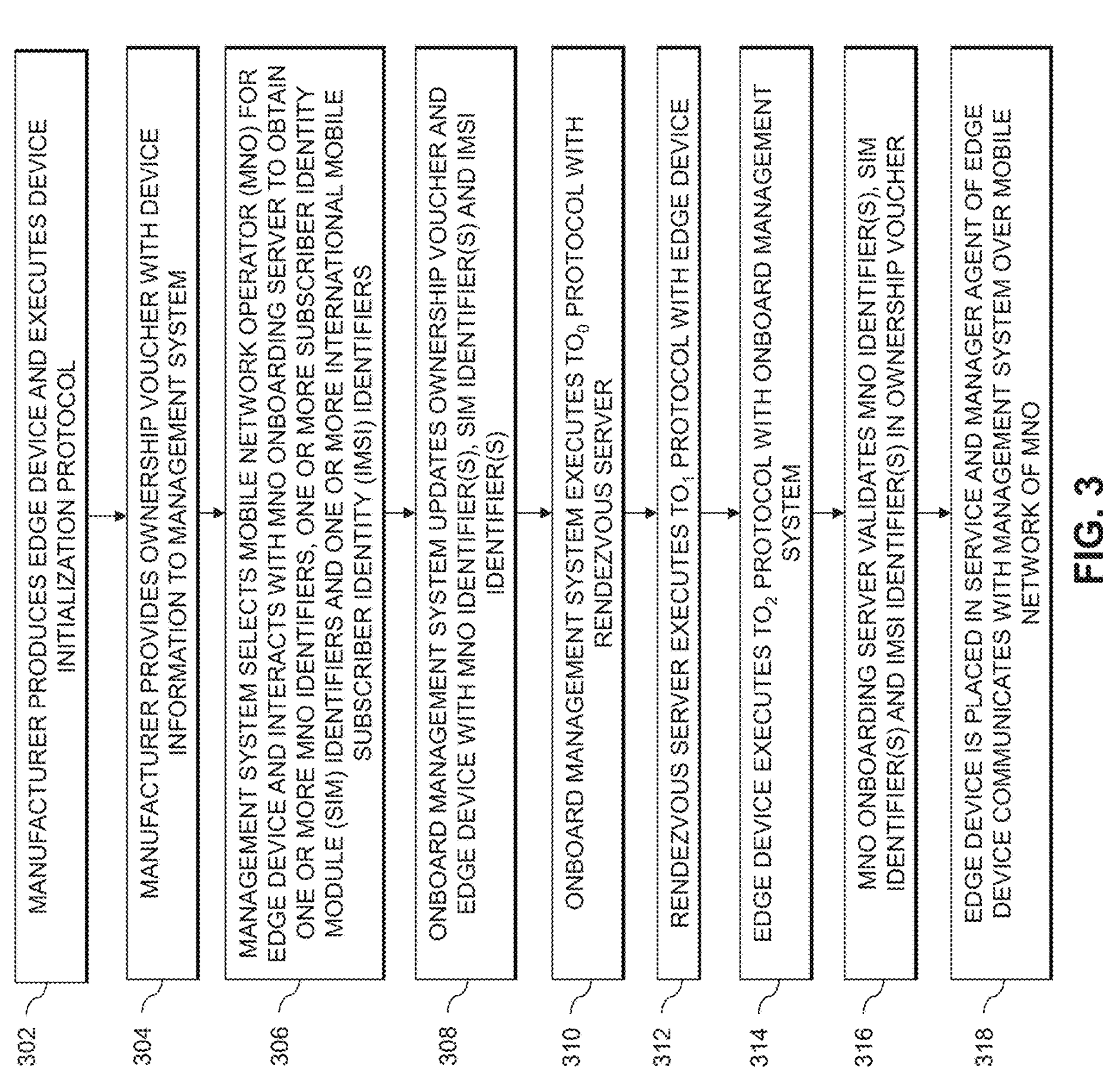
FIG. 3 is a flow diagram illustrating an exemplary process for edge computing device validation in an illustrative embodiment.

FIG. 3 is a flow diagram illustrating an exemplary process for edge computing device validation in an illustrative embodiment. In the example of FIG. 3, a manufacturer 201 produces an edge device 240 and executes a device initialization (DI) protocol in step 302 (e.g., using the restricted operating environment 245). The manufacturer 201 then provides an ownership voucher 252 with device information to the management system 202 in step 304. The management system 202 selects an MNO for the edge device 240 and interacts with the MNO onboarding server 203 to obtain one or more MNO identifiers, one or more subscriber identity module (SIM) identifiers and one or more international mobile subscriber identity (IMSI) identifiers in step 306.

In step 308, the onboard management system 225 updates the ownership voucher 252 and edge device 240 with the one or more MNO identifiers, one or more SIM identifiers and one or more IMSI identifiers. The onboard management system 225 then executes the $TO_0$ protocol with the rendezvous server 227 in step 310. The rendezvous server 227 executes the $TO_1$ protocol with edge device 240 (e.g., using the restricted operating environment 245) in step 312.

The edge device 240 executes the $TO_2$ protocol in step 314 with the onboard management system 225. In step 316, the MNO onboarding server 203 validates the one or more MNO identifiers, one or more SIM identifiers and one or more IMSI identifiers in the ownership voucher 252. The edge device 240 is then placed in service in step 318 and the manager agent 243 of the edge device 240 communicates with the management system 202 over a mobile network of the MNO.

Figure 4:
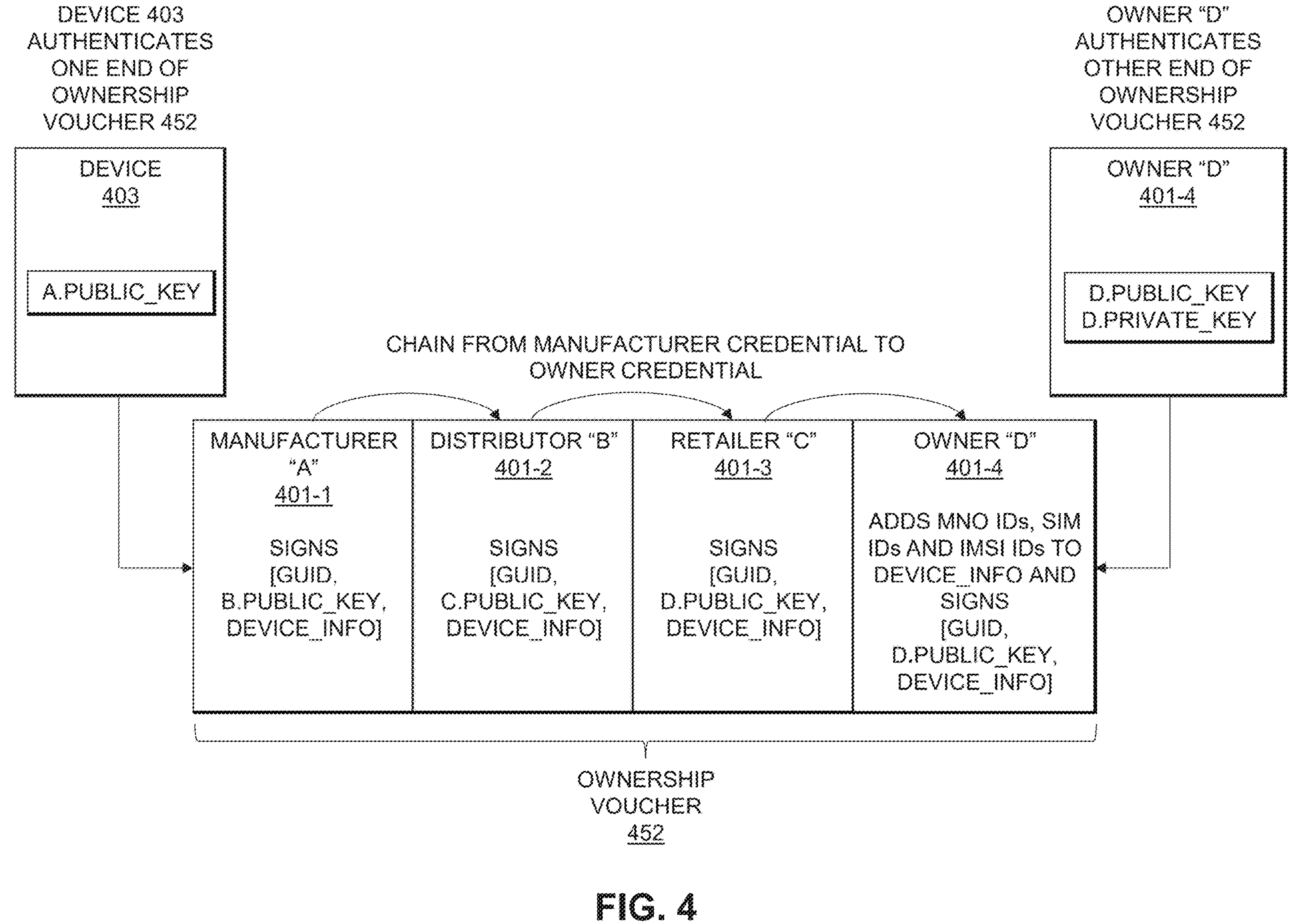
FIG. 4 shows generation of an ownership voucher utilized in secure device onboarding of edge computing devices in an illustrative embodiment.

FIG. 4 shows generation of an ownership voucher 452 utilized in secure device onboarding of edge computing devices in an illustrative embodiment. In the example of FIG. 4, the ownership voucher 452 is processed by a manufacturer "A" 401-1, a distributor "B" 401-2, a retailer "C" 401-3 and an owner "D" 401-4. The manufacturer "A" 401-1, distributor "B" 401-2, retailer "C" 401-3 and owner "D" 401-4 provide internal signatures that create a chain from the manufacturer to owner credential in the ownership voucher. The manufacturer "A" 401-1 signs the ownership voucher 452 with [GUID, B.Public_Key, Device_Info], the distributor 401-2 "B" signs the ownership voucher 452 with [GUID, C.Public_Key, Device_Info], the retailer 401-3 signs the ownership voucher 452 with [GUID, D.Public_Key, Device_Info] and the owner "D" 401-4 adds the MNO identifiers, the SIM identifiers and the IMSI identifiers to the Device_Info in the ownership voucher 452 and signs the ownership voucher 452 with [GUID, D.Public_Key, Device_Info]. The device 403 can authenticate one end of the ownership voucher 452, as it has possession of A.Public_Key. The owner "D" 401-4 can authenticate the other end of the ownership voucher 452, as it has possession of D.Public_Key and D.Private_Key. The ownership voucher 452 is a structured digital document that links the manufacturer "A" 401-1 with the owner "D" 401-4, and includes a chain of signed public keys. Each signature of a public key authorizes the possessor of the corresponding private key to take ownership of the device 403 or pass ownership through another link in the chain. The signatures in the ownership voucher 452 thereby create a chain of trust from the manufacturer "A" 401-1 to the owner "D" 401-4.

Ownership voucher signing includes initializing a TEE with a hash of the manufacturer "A" 401-1 public key (A.Public_Key). Voucher signing includes encoding the public key of the owner "D" 401-4 and signing using the private key of the manufacturer "A" 401-1, and updating the ownership voucher 452. The first transfer (e.g., from a first owner to a second owner) of the ownership voucher 452 includes encoding the public key of the second owner and signing using the private key of the first owner, and updating the ownership voucher 452. In the FIG. 4 example, the transfer between the manufacturer "A" 401-1 and the distributor "B" 401-2 would thus include the manufacturer "A" 401-1 encoding the public key of the distributor "B" 401-2 (B.Public_Key) and signing using the private key of the manufacturer "A" 401-1 (A.Private_Key). Similar processing would be utilized for transfer of the ownership voucher 452 from the distributor "B" 401-2 to the retailer "C" 401-3, and so on.

Verification of the ownership voucher 452 may proceed as follows. The owner "D" 401-4 may sign a nonce using its private key (D.Private_Key), and send the ownership voucher 452 with the signature (the signed nonce) to the device 403. The device 403 verifies the nonce using the public key of the owner "D" 401-4 (D.Public_Key), which verifies that the owner "D" 401-4 has the corresponding private key (D.Private_Key). The device 403 then gets the public key of the manufacturer "A" 401-1 (A.Public_Key) from the first entry of the ownership voucher 452, and verifies the hash of the public key of the manufacturer "A" 401-1 stored in its TEE. The device 403 can then verify the signatures of the ownership voucher 452 in sequence, until it comes to the public key of the owner "D" 401-4 (D.Public_Key), which is the last entry of the ownership voucher 452. This means that the chain of ownership is trusted.

Figure 5:
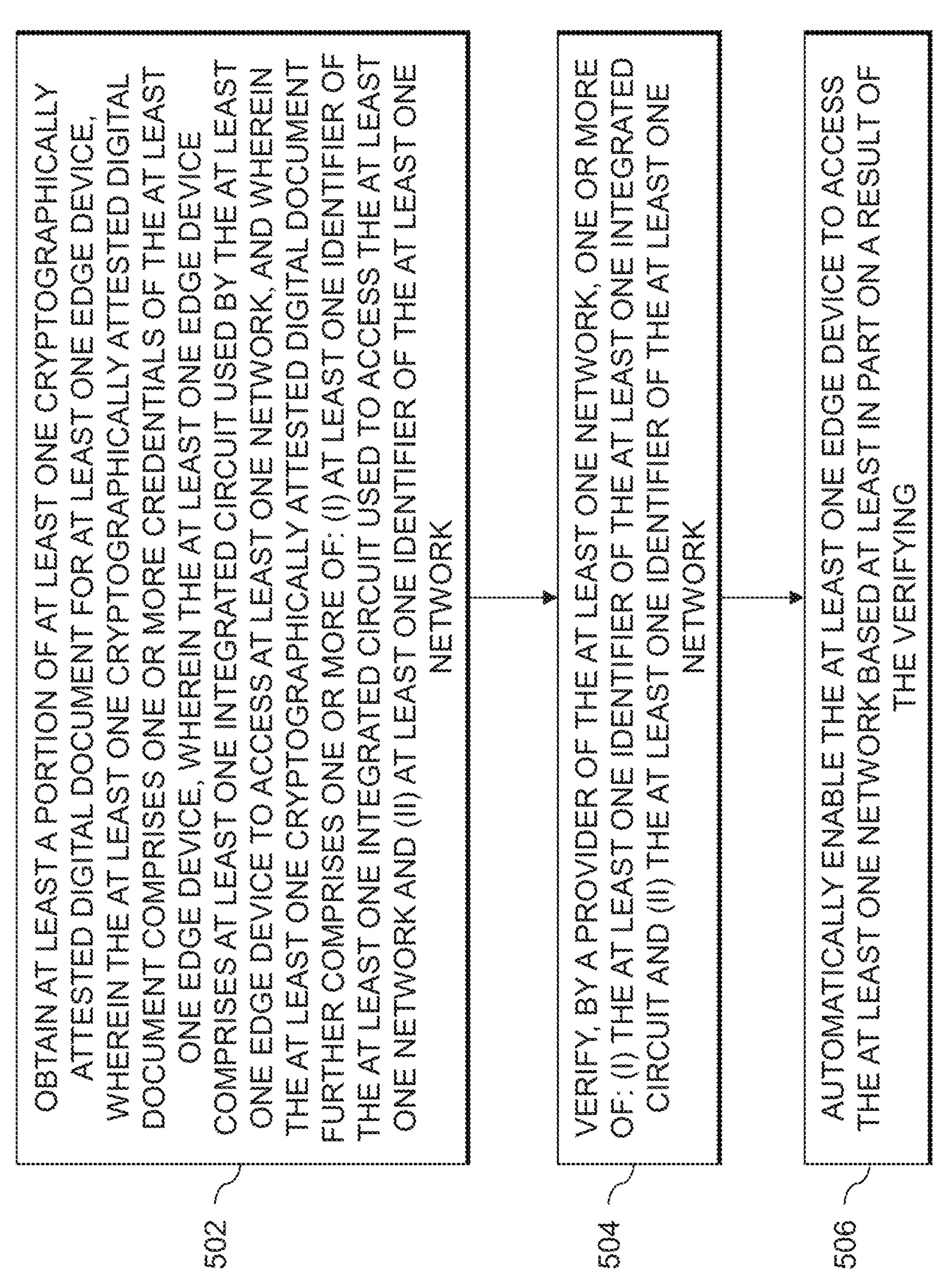
FIG. 5 is a flow diagram illustrating an exemplary process for validating edge computing devices using verification of network identifiers in an illustrative embodiment.

FIG. 5 is a flow diagram illustrating an exemplary process for validating edge computing devices using verification of network identifiers in an illustrative embodiment. In the example of FIG. 5, at least a portion of at least one cryptographically attested digital document (e.g., an ownership voucher) is obtained for at least one edge device in step 502, wherein the at least one cryptographically attested digital document comprises one or more credentials of the at least one edge device, wherein the at least one edge device comprises at least one integrated circuit used by the at least one edge device to access at least one network, and wherein the at least one cryptographically attested digital document further comprises one or more of: (i) at least one identifier of the at least one integrated circuit used to access the at least one network and (ii) at least one identifier of the at least one network.

In step 504, at least one processing device of a provider of the at least one network verifies one or more of: (i) the at least one identifier of the at least one integrated circuit and (ii) the at least one identifier of the at least one network. The at least one edge device is automatically enabled in step 506 to access the at least one network based at least in part on a result of the verifying of step 504.

In at least some embodiments, the at least one cryptographically attested digital document further comprises at least one identifier of at least one subscriber of the at least one network and wherein the verifying, by the at least one processing device of the provider of the at least one network, comprises verifying the at least one identifier of at least one subscriber of the at least one network. The process of FIG. 5 may further comprise onboarding the at least one edge device to an edge infrastructure management platform, and wherein the at least one cryptographically attested digital document is updated during the onboarding to comprise one or more of: (i) the at least one identifier of the at least one integrated circuit used to access the at least one network and (ii) the at least one identifier of the at least one network. The at least one integrated circuit may comprise one or more of a subscriber identity module, a universal integrated circuit card and an embedded universal integrated circuit card.

In one or more embodiments, an entity associated with the at least one edge device updates the at least one cryptographically attested digital document with the one or more of: (i) the at least one identifier of the at least one integrated circuit and (ii) the at least one identifier of the at least one network. The at least one cryptographically attested digital document may comprise an ownership voucher.

In at least one embodiment, the one or more credentials of the at least one edge device may comprise one or more keys. The one or more keys may comprise at least an asymmetric public key of a public-private key pair.

The particular processing operations and other network functionality described in conjunction with FIGS. 2 through 5, for example, are presented by way of illustrative example only, and should not be construed as limiting the scope of the disclosure in any way. Alternative embodiments can use other types of processing operations to provide functionality for validating edge computing devices using verification of network identifiers. For example, the ordering of the process steps may be varied in other embodiments, or certain steps may be performed concurrently with one another rather than serially. In one aspect, the process can skip one or more of the steps. In other aspects, one or more of the steps are performed simultaneously. In some aspects, additional steps can be performed.

In one or more embodiments, the disclosed techniques for edge computing device validation and compliance integrate modem technology, SIM capabilities and FDO principles, along with an ownership voucher system. In this manner, the security and trustworthiness of the onboarding process in edge computing environments is enhanced. Ownership vouchers for edge devices may be extended during the onboarding process to include SIM identifiers (or another network card identifier), MNO identifiers and/or customer IMSI ranges specific to each customer and these values may be validated by a mobile network operator prior to enabling a given edge device to access a network provided by the mobile network operator.

It should also be understood that the disclosed techniques for validating edge computing devices using verification of network identifiers can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

In one or more embodiments, the SIM cards described herein may be implemented using eSim modules (sometimes referred to as eUICC modules or digital SIMs). An eSIM is a digital version of the physical SIM cards described herein, identifying an edge device virtually to provide a network connection. The eSIM is remotely programmable using software.

A designated range of Embedded SIM Electronic IDs (EID) may be defined and integrated into the disclosed ownership voucher system, serving as a unique identifier to authenticate the embedded SIM card. Upon an initial startup, edge devices may conduct a verification check of the eSIM EID, the MNO identifiers and the customer IMSI against specified ranges in the ownership voucher system. In this manner, the authenticity of the embedded SIM card is ensured, aligning with defined legitimate ranges for EID, MNO identifiers, and IMSI ranges.

The disclosed techniques for edge computing device validation may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services and/or storage services can be offered to cloud infrastructure tenants or other system users as a Platform-as-a-Service (PaaS) model, an Infrastructure-as-a-Service (IaaS) model, a Storage-as-a-Service (STaaS) model and/or a Function-as-a-Service (FaaS) model, although it is to be appreciated that numerous other cloud infrastructure arrangements could be used.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based edge computing device validation engine, or portions thereof, are illustratively implemented for use by tenants of such a multi-tenant environment.

Cloud infrastructure as disclosed herein can include cloud-based systems. Virtual machines provided in such systems can be used to implement at least portions of an edge computing device validation platform in illustrative embodiments. The cloud-based systems can include object stores.

In some embodiments, the cloud infrastructure additionally or alternatively comprises a plurality of containers implemented using container host devices. For example, a given container of cloud infrastructure illustratively comprises a Docker container or other type of Linux Container. The containers may run on virtual machines in a multi-tenant environment, although other arrangements are possible. The containers may be utilized to implement a variety of different types of functionalities within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Figure 6:
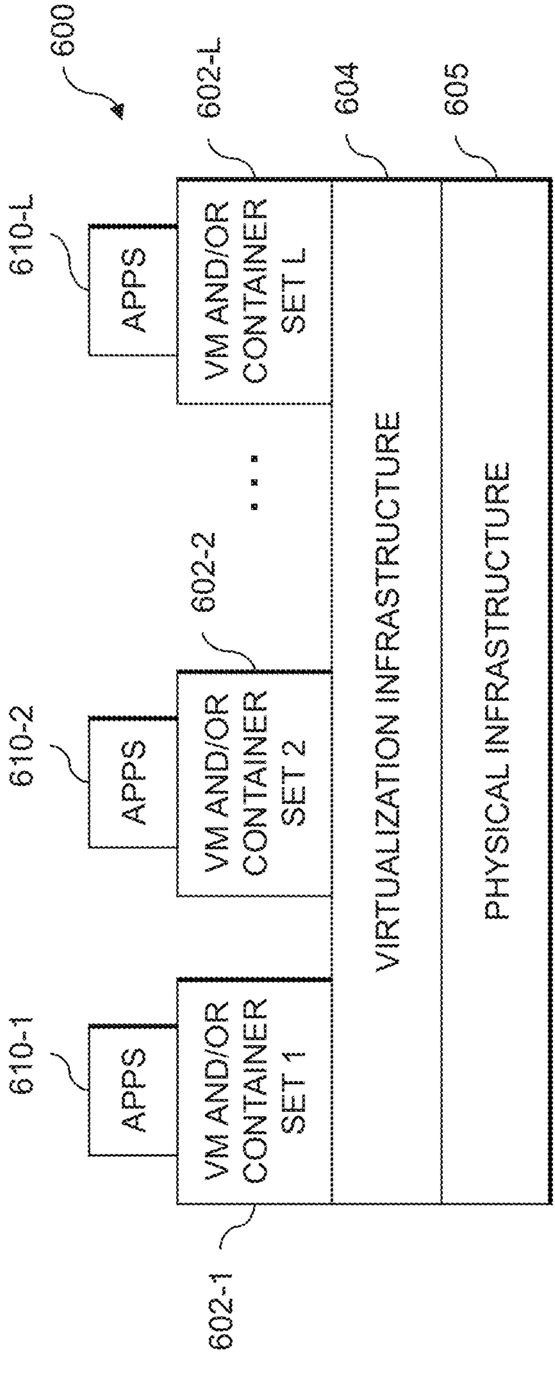
FIG. 6 illustrates an exemplary processing platform that may be used to implement at least a portion of one or more embodiments of the disclosure comprising a cloud infrastructure.

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple VMs and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide edge computing device validation functionality of the type described above for one or more processes running on a given one of the VMs. For example, each of the VMs can implement edge computing device validation control logic and associated edge computing device onboarding functionality for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter®. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide edge computing device validation functionality of the type described above for one or more processes running on different ones of the containers. For example, a container host device supporting multiple containers of one or more container sets can implement one or more instances of edge computing device validation control logic and associated edge computing device onboarding functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises at least a portion of the given system and includes a plurality of processing devices, denoted 702-1, 702-2, 702-3, . . . 702-K, which communicate with one another over a network 704. The network 704 may comprise any type of network, such as a WAN, a LAN, a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an ASIC, an FPGA or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Figure 7:
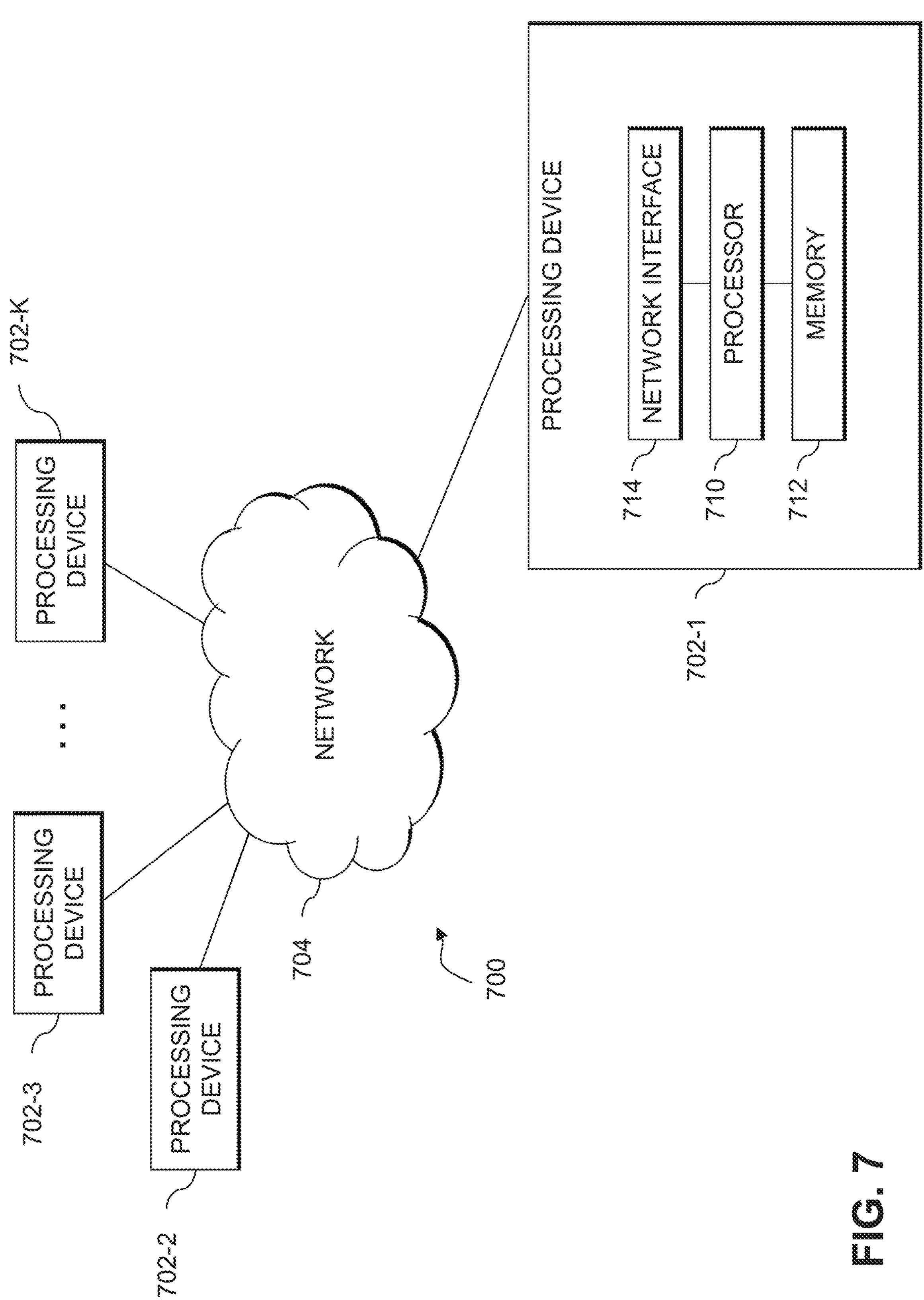
FIG. 7 illustrates another exemplary processing platform that may be used to implement at least a portion of one or more embodiments of the disclosure.

Multiple elements of an information processing system may be collectively implemented on a common processing platform of the type shown in FIG. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

obtaining at least a portion of at least one cryptographically attested digital document for at least one edge device, wherein the at least one cryptographically attested digital document comprises one or more credentials of the at least one edge device, wherein the at least one edge device comprises at least one integrated circuit used by the at least one edge device to access at least one network, wherein the at least one edge device is onboarded to an edge infrastructure management platform, and wherein the at least one cryptographically attested digital document is updated during an onboarding of the at least one edge device to further comprise one or more of: (i) at least one identifier of the at least one integrated circuit used to access the at least one network, obtained from a provider of the at least one network during the onboarding, and (ii) at least one identifier of the at least one network, obtained from the provider of the at least one network during the onboarding;

verifying, by at least one processing device of the provider of the at least one network, one or more of: (i) the at least one identifier of the at least one integrated circuit and (ii) the at least one identifier of the at least one network; and automatically enabling the at least one edge device to access the at least one network based at least in part on a result of the verifying;

wherein the method is performed by at least one processing device comprising a processor coupled to a memory.

2. The method of claim 1, wherein the at least one cryptographically attested digital document further comprises at least one identifier of at least one subscriber of the at least one network and wherein the verifying, by the at least one processing device of the provider of the at least one network, comprises verifying the at least one identifier of at least one subscriber of the at least one network.

3. The method of claim 1, wherein the at least one integrated circuit comprises one or more of a subscriber identity module, a universal integrated circuit card and an embedded universal integrated circuit card.

4. The method of claim 1, wherein an entity associated with the at least one edge device updates the at least one cryptographically attested digital document with the one or more of: (i) the at least one identifier of the at least one integrated circuit and (ii) the at least one identifier of the at least one network.

5. The method of claim 1, wherein the at least one cryptographically attested digital document comprises an ownership voucher.

6. The method of claim 1, wherein the one or more credentials of the at least one edge device comprise one or more keys.

7. The method of claim 6, wherein the one or more keys comprise at least an asymmetric public key of a public-private key pair.

8. An apparatus, comprising:

at least one processing device comprising a processor coupled to a memory;

the at least one processing device being configured to implement the following steps:

obtaining at least a portion of at least one cryptographically attested digital document for at least one edge device, wherein the at least one cryptographically attested digital document comprises one or more credentials of the at least one edge device, wherein the at least one edge device comprises at least one integrated circuit used by the at least one edge device to access at least one network, wherein the at least one edge device is onboarded to an edge infrastructure management platform, and wherein the at least one cryptographically attested digital document is updated during an onboarding of the at least one edge device to further comprise one or more of: (i) at least one identifier of the at least one integrated circuit used to access the at least one network, obtained from a provider of the at least one network during the onboarding, and (ii) at least one identifier of the at least one network, obtained from the provider of the at least one network during the onboarding;

verifying, by at least one processing device of the provider of the at least one network, one or more of: (i) the at least one identifier of the at least one integrated circuit and (ii) the at least one identifier of the at least one network; and automatically enabling the at least one edge device to access the at least one network based at least in part on a result of the verifying.

9. The apparatus of claim 8, wherein the at least one cryptographically attested digital document further comprises at least one identifier of at least one subscriber of the at least one network and wherein the verifying, by the at least one processing device of the provider of the at least one network, comprises verifying the at least one identifier of at least one subscriber of the at least one network.

10. The apparatus of claim 8, wherein the at least one integrated circuit comprises one or more of a subscriber identity module, a universal integrated circuit card and an embedded universal integrated circuit card.

11. The apparatus of claim 8, wherein an entity associated with the at least one edge device updates the at least one cryptographically attested digital document with the one or more of: (i) the at least one identifier of the at least one integrated circuit and (ii) the at least one identifier of the at least one network.

12. The apparatus of claim 8, wherein the one or more credentials of the at least one edge device comprise one or more keys, and wherein the one or more keys comprise at least an asymmetric public key of a public-private key pair.

13. A non-transitory processor-readable storage medium having stored therein program code of one or more software programs, wherein the program code when executed by at least one processing device causes the at least one processing device to perform the following steps:

obtaining at least a portion of at least one cryptographically attested digital document for at least one edge device, wherein the at least one cryptographically attested digital document comprises one or more credentials of the at least one edge device, wherein the at least one edge device comprises at least one integrated circuit used by the at least one edge device to access at least one network, wherein the at least one edge device is onboarded to an edge infrastructure management platform, and wherein the at least one cryptographically attested digital document is updated during an onboarding of the at least one edge device to further comprise one or more of: (i) at least one identifier of the at least one integrated circuit used to access the at least one network, obtained from a provider of the at least one network during the onboarding, and (ii) at least one identifier of the at least one network, obtained from the provider of the at least one network during the onboarding;

verifying, by at least one processing device of the provider of the at least one network, one or more of: (i) the at least one identifier of the at least one integrated circuit and (ii) the at least one identifier of the at least one network; and automatically enabling the at least one edge device to access the at least one network based at least in part on a result of the verifying.

14. The non-transitory processor-readable storage medium of claim 13, wherein the at least one cryptographically attested digital document further comprises at least one identifier of at least one subscriber of the at least one network and wherein the verifying, by the at least one processing device of the provider of the at least one network, comprises verifying the at least one identifier of at least one subscriber of the at least one network.

15. The non-transitory processor-readable storage medium of claim 13, wherein the at least one integrated circuit comprises one or more of a subscriber identity module, a universal integrated circuit card and an embedded universal integrated circuit card.

16. The non-transitory processor-readable storage medium of claim 13, wherein an entity associated with the at least one edge device updates the at least one cryptographically attested digital document with the one or more of: (i) the at least one identifier of the at least one integrated circuit and (ii) the at least one identifier of the at least one network.

17. The non-transitory processor-readable storage medium of claim 13, wherein the one or more credentials of the at least one edge device comprise one or more keys.

18. The non-transitory processor-readable storage medium of claim 17, wherein the one or more keys comprise at least an asymmetric public key of a public-private key pair.

19. The non-transitory processor-readable storage medium of claim 13, wherein the at least one cryptographically attested digital document comprises an ownership voucher.

20. The apparatus of claim 8, wherein the at least one cryptographically attested digital document comprises an ownership voucher.

* * * * *